US007026047B2

(12) United States Patent
Krolzig

(10) Patent No.: US 7,026,047 B2
(45) Date of Patent: Apr. 11, 2006

(54) SECURITY FILM SYSTEM WITH REACTIVE ADHESIVES

(75) Inventor: Olaf Krolzig, Cham (CH)

(73) Assignee: OVD Kinegram AG, Zug (CH)

( * ) Notice: Subject to any disclaimer, the term of this patent is extended or adjusted under 35 U.S.C. 154(b) by 174 days.

(21) Appl. No.: 10/473,645

(22) PCT Filed: Mar. 27, 2002

(86) PCT No.: PCT/EP02/03442

§ 371 (c)(1),
(2), (4) Date: Sep. 29, 2003

(87) PCT Pub. No.: WO02/081585

PCT Pub. Date: Oct. 17, 2002

(65) Prior Publication Data

US 2004/0115428 A1 Jun. 17, 2004

(30) Foreign Application Priority Data

Apr. 5, 2001 (DE) ................................ 101 17 198

(51) Int. Cl.
*C09J 7/02* (2006.01)
*B42D 15/10* (2006.01)

(52) U.S. Cl. ...................... 428/354; 428/343; 428/347; 428/349; 428/915; 428/916

(58) Field of Classification Search ................ 428/343, 428/347, 349, 915, 916, 354
See application file for complete search history.

(56) References Cited

U.S. PATENT DOCUMENTS

| | | | | |
|---|---|---|---|---|
| 4,855,182 | A * | 8/1989 | Ondrejas et al. | 428/343 |
| 5,942,330 | A | 8/1999 | Kelley | |
| 2004/0115428 | A1* | 6/2004 | Krolzig | 428/355 RA |

FOREIGN PATENT DOCUMENTS

| | | | |
|---|---|---|---|
| DE | 28 31 853 | A1 | 1/1980 |
| DE | 40 22 584 | A1 | 1/1992 |
| DE | 41 21 598 | A1 | 1/1993 |
| DE | 44 10 785 | A1 | 10/1995 |
| DE | 195 12 725 | | 9/1996 |
| DE | 199 04 282 | | 8/2000 |
| JP | XP-002205781 | | 4/1981 |
| WO | WO 92/01572 | | 2/1992 |
| WO | WO 99/29755 | | 6/1999 |
| WO | WO 01/89831 | A1 | 11/2001 |

* cited by examiner

*Primary Examiner*—Daniel Zirker
(74) *Attorney, Agent, or Firm*—Hoffmann & Baron, LLP

(57) ABSTRACT

Proposed is a security film system for documents or in general data carriers having a transfer layer and an adhesive or gluing layer portion which has at least one micro-encapsulated reactive adhesive component, wherein the adhesive or gluing layer portion remains activatable over a period of time of up to at least one year and the at least one reactive adhesive component hardens after activation to form a duromer.

16 Claims, No Drawings

SECURITY FILM SYSTEM WITH REACTIVE ADHESIVES

This application claims priority based on an International Application filed under the Patent Cooperation Treaty, PCT/EP02/03442, filed on Mar. 27, 2002, and German Patent Application No. 101 17 198.6, filed on Apr. 5, 2001.

BACKGROUND OF THE INVENTION

Security film systems of that kind are wide-spread and are used in the form of hot stamping films or protective laminate films in the most widely varying areas.

Irrespective of their area of use, whether as a security element for banknotes, check or credit cards or for identity documents, the security film systems known from the state of the art are generally of a substantially identical layer structure. In that respect, hot stamping or laminate films of that kind generally have an adhesive layer portion for fixing on a substrate, that is to say an article to be decorated or protected. Arranged on that adhesive layer portion is a transfer layer which is composed of one or more layer portions and includes corresponding security elements. In that case, metallised or non-metallised diffraction structures can be contained in the layer constitution, wherein the individual layer portions can also be provided over the full surface area or part thereof and can be of varying colors. Frequently those layer portions are formed by differing lacquers which are preferably applied by means of printing processes. It is possible in that way to produce decorative patterns or security elements in accurate register relationship. The transfer layer may further include lacquer layer portions which can be irreversibly modified subsequently, for example by irradiation with a laser.

Security film systems of that kind are generally known in regard to the structure of the transfer layer and were the subject of numerous patent applications in recent times.

The specified security film systems in that case are usually provided with thermoplastic adhesive systems. Those security film systems are transferred on to the article to be protected, for example a personalised pass page or the like, by means of pressure and temperature. In that procedure, the adhesive is caused to melt by means of the action of temperature in the operation of transferring the system on to the article. In that case the adhesive is physically anchored in the substrate to be decorated or provided with a security element, or the surface of the material of the substrate, and provides for the necessary bonding adhesion after the arrangement has cooled down. No chemical reaction takes place in that situation. A particular disadvantage of those adhesive systems however is that they can be reversibly melted at any time and thus the transfer layer containing the security element can be easily detached by heating and applied to another substrate. Such thermoplastic bonds are thus a potential weakness in security film systems, by virtue of the thermoplastic properties of such bonds.

SUMMARY OF THE INVENTION

An improvement in terms of forgery-proof nature of the above-mentioned security film systems is achieved by the use of reactive adhesive systems which cross-link under room conditions. It is possible in that way to produce compact composite systems which can no longer be melted. In that case, those adhesive systems experience a change in their chemical structure during the reaction and become a duromer material. They can no longer be melted or deformed by the action of temperature. If the temperature is increased excessively the adhesive layer portion suffers decomposition. In general the temperatures for that to happen are above 200° C. so that it can be assumed that the composite system is substantially resistant to mechanical, thermal and chemical attacks and attempts at manipulation and forgery are at least made more difficult than with thermoplastic adhesive systems.

DE 40 22 584 discloses a series of single- or multi-component reactive adhesives for a use of that kind. In the case of the single-component reactive adhesive, in accordance with the disclosure, there is an adhesive layer portion only on the hot stamping film. That single-component reactive adhesive, in accordance with DE 40 22 584, involves a masked cross-linker which is liberated under the effect of heat and which contains for example a blocked polyisocyanate.

However that single-component reactive adhesive which is known from the state of the art suffers from the disadvantage that the cross-linking reaction progresses slowly even under ambient conditions which usually apply, so that hot stamping films provided with a single-component reactive adhesive of that kind only have a limited storage life.

In the case of the multi-component reactive adhesive which is also known from DE 40 22 584, at least one second component is necessarily to be provided on the substrate to be decorated. That gives rise to serious limitations in regard to the security film system or the hot stamping film as they can only be applied to substrates which have a layer with a corresponding reactive adhesive component.

WO 99/29755 discloses a process for the production of and the use of storage-stable, latently reactive layers or powders of surface-deactivated polyisocyanates and dispersion polymers with functional groups. The latently reactive products in layer or powder form, in accordance with the disclosure, serve to produce adhesive joins and coatings, wherein gluing of films is mentioned in general terms but is not discussed in greater detail.

Therefore the object of the present invention is to provide a security film system which is as resistant to forgery and manipulation as possible, which is simple and economical to produce, which can be used over a prolonged period of time after manufacture and which as far as possible avoids the disadvantages known from the state of the art.

A further object of the present invention is to provide a security film system for documents, which is subjected to as few limitations as possible in respect of the substrate to be protected or the document to be protected, and the location and/or the time of application to the substrate or document respectively.

The foregoing object is attained by a security film system for documents having the features of claim 1.

Advantageous configurations of the invention are the subject-matter of claims 2 through 10 and claims 12 and 13.

The present object is further attained by a process for the production of a security film system as set forth in claim 11.

DESCRIPTION OF THE PREFERRED EMBODIMENTS

The security film system for documents is advantageously particularly flexible to handle because the steps which are effected after production of the transfer layer, for example the diffractive film composite, up to the application of the transfer layer to a substrate or document, can be carried out at various locations and at various times.

In general however the adhesive or gluing layer portion is applied directly following production of the transfer layer. The micro-encapsulated reactive adhesive which is used in accordance with the invention is available commercially, for example under the name Purbond HCM® from Ebnöther AG, Sempach, Switzerland. A reactive adhesive of that kind can be handled particularly well and can be applied to the transfer layer for example in a powder coating process at temperatures of between about 60 and 70° C., wherein the fixing which takes place at that temperature causes the formation of a lacquer-like adhesive or gluing layer portion which is not yet activated and which remains activatable over a surprisingly particularly long period of time. The adhesive or gluing layer portion of the present security film system remains activatable over a period of time of up to at least one year.

In that respect a particular advantage of the security film system according to the invention for documents is the possibility of decentral document use, that is to say application of the transfer layer at a location different from the production location thereof. In contrast to what are known as 'online processes' in which coating, application and hardening of the adhesive, that is to say production of the composite arrangement with the document to be protected, take place at the location of manufacture of the transfer layer, the present invention permits much more flexible use of the security film system for documents.

Usually the film system having the adhesive or gluing layer portion according to the invention, that is to say the combination of the transfer layer and the adhesive or gluing layer portion is provided on rolls or in other desired formats which are good to handle, and taken to the location of use in that fashion. The term location of use is used in the present context to denote the location at which the security film system is applied to a document or generally a substrate. In that case, the security film system according to the invention is placed and positioned on the document or substrate and briefly raised for example by a rolling lamination process to an activation temperature in the range of between about 110 and 150° C. In that situation, thermal splitting of the micro-encapsulation takes place and subsequently a corresponding cross-linking reaction in which the at least one micro-encapsulated reacted adhesive component contained in the adhesive or gluing layer portion reacts to form a duromer and forms a firm, practically non-releasable connection of the transfer layer to the document or substrate to be protected.

The micro-encapsulated reactive adhesive component is preferably thermally activatable, in which respect however there is basically also the possibility of using for example reactive adhesives which are activatable by UV or X-ray radiation as long as they can be fixed in an adhesive or gluing layer and remain activatable for a sufficiently long period of time. Particularly preferably the at least one reactive adhesive component is formed by a micro-encapsulated isocyanate or by a micro-encapsulated phthalic acid anhydride.

It has surprisingly been found that the adhesive or gluing layer portion in the security film system according to the invention for documents is easily accessible to partial activation in relation to the surface area and partial activation in relation to the mass of the at least one reactive adhesive component. In that respect, covering of the adhesive and gluing layer portion by means of a thermally insulating stencil and short-term (partial) heating of the regions not covered by the stencil is adequate for partial activation. The degree of partial pre-cross-linking can be easily predetermined by control in respect of the temperature and the duration of heating of the regions which are not covered by the stencil. It is possible in that way to provide the security film system according to the invention with regions involving a different adhesive force.

The prescribed regions involving a differing adhesive force can be produced in that respect in any arrangement, thus for example in the form of more or less abstract patterns or in the form of alphanumeric characters such as for example letters or serial numbers.

In a particularly preferred embodiment of the present invention which is particularly suitable for decentral use the adhesive or gluing layer portion, on the side which does not face towards the transfer layer, has a protective layer portion. That ensures that, during storage of the security film system according to the invention and/or transportation, the adhesive layer portion does not suffer from soiling which can adversely affect the capability of adhesion to the document or substrate to be protected. A protective layer portion of that kind is formed in particular by a removable film because the protective layer portion in that form can be removed particularly easily and without any problem.

Particularly preferably the transfer layer of the security film system according to the invention includes a diffraction layer portion or a layer portion which produces an optical diffraction pattern as optically effective structures of that kind are accepted and established as a security element in many different uses and areas of use and can be handled particularly well.

In a development of the present invention, on the side which does not face towards the adhesive or gluing layer portion, the transfer layer has a protective layer portion. That protective layer portion can be in the form of a fixed protective lacquer layer portion or also in the form of a removable protective layer portion which on the one hand protects the surface of the security film system, which is later visible, from damage during manufacture, storage and transportation. In particular it can also be in the form of a carrier layer portion for the security film system.

In this respect it is basically to be noted that the man skilled in the art of security elements and hot stamping and decorative films is familiar with the basic layer structure of such film systems and the transfer layers thereof.

In regard to the protective and/or carrier layer portion arranged on the transfer layer, it should also be mentioned that preferably disposed between the transfer layer and the protective and/or carrier layer portion is a separating layer portion which facilitates the detachment of that layer portion. In that respect, in a particular configuration, the separating layer portion is at the same time in the form of a protective layer portion which remains on the transfer layer.

The security film system according to the invention can be used extremely advantageously in the form of labels or stickers. In that case the labels or stickers can be stamped out of an extensive security film system or can be provided in stamped-out form.

Using labels or stickers of that kind makes it possible to implement simplified application to documents or substrates to be secured.

The invention is claimed is:

1. A security film system for attachment to documents comprising:

a transfer layer;

a protective layer and/or carrier layer disposed on said transfer layer; and an adhesive or gluing layer portion disposed on the side of the transfer layer opposite the protective layer and/or carrier layer, wherein the adhesive or gluing layer portion comprises at least one micro-encapsulated reactive adhesive component, and wherein the adhesive or gluing layer portion remains activatable over a period of time of up to at least one year such that the security film may be applied to the document at various locations and times and further wherein the at least one reactive adhesive component hardens after activation to form a duromer.

2. A security film system as set forth in claim 1, wherein the at least one reactive adhesive component is formed by a micro-encapsulated isocyanate or phthalic acid anhydride.

3. A security film system as set forth in claim 1, wherein at least one reactive adhesive component is thermally activatable.

4. A security film system as set forth in claim 1, wherein the adhesive or gluing layer portion has a protective layer portion on the side which does not face towards the transfer layer.

5. A security film system as set forth in claim 4, wherein the protective layer portion is formed by a removable film.

6. A security film system as set forth in claim 1, wherein the transfer layer includes a diffraction layer portion or a layer portion which produces an optical diffraction pattern.

7. A security film system as set forth in claim 1, further comprising a separating layer portion arranged between the protective layer portion and/or carrier layer portion and the transfer layer.

8. A security film system as set forth in claim 7, wherein the separating layer portion is at the same time in the form of a protective layer portion for the transfer layer.

9. A process for the production of a security film system as set forth in claim 1, wherein the adhesive or gluing layer portion is applied in a powder coating process.

10. A security film system as set forth in claim 1, wherein it is in the form of a label or sticker.

11. A security film system as set forth in claim 10, wherein the label or sticker is in stamped-out form.

12. A method of applying a security device to an article to prevent forgery and manipulation of said article, comprising the steps of:

forming a security device, said security device including a transfer layer having a protective layer and/or carrier layer disposed on a side of said transfer layer;

applying an adhesive or gluing layer portion to said transfer layer on the side of the transfer layer opposite the protective layer and/or carrier layer wherein said adhesive or gluing layer comprises a micro-encapsulated reactive adhesive component, said adhesive layer remaining activatable over a period of time up to at least one year;

applying the security device to the article; and activating the adhesive to affix the security device to the article, said adhesive forming a duromer upon activation.

13. The method of claim 12, wherein the transfer layer further includes a layer portion which produces an optical diffractive pattern.

14. The method of claim 12, wherein the activating step is performed at a time and location different from the time and location of applying the adhesive layer.

15. The method of claim 12, further comprising the step of applying a separating layer between the transfer layer and protective layer.

16. The method of claim 12, wherein the security device comprises one of a label and a sticker.

* * * * *